ated Dec. 9, 1969

United States Patent Office 3,483,023
Patented Dec. 9, 1969

3,483,023
HEAT AND SOLVENT SEALABLE POLYOLEFIN FILMS
Billy R. Dotson, Edward D. Morrison, and Robert F. Williams, Jr., Rochester, N.Y., assignors to Eastman Kodak Company, Rochester, N.Y., a corporation of New Jersey
No Drawing. Filed June 5, 1967, Ser. No. 643,384
Int. Cl. C09d *3/68;* B32b *27/04*
U.S. Cl. 117—122       5 Claims

ABSTRACT OF THE DISCLOSURE

Non-blocking, heat and solvent sealable polyolefin films can be produced by coating polyolefin substrates with a blend of copolymers of (a) ethylene/vinyl acetate and
(b) ethylene/ethyl acrylate;

said copolymers being present in the blend in weight ratios, respectively of from about 0.3 to 1 to about 1 to 0.7.

---

This invention relates to polyolefin films that are both heat and solvent sealable. More particularly, this invention relates to polyolefin films coated with a blend of copolymers of which ethylene is the major component.

Films of a thickness of the order of from about 0.5 mil to about 10 mils prepared from polyolefin resins such as polyethylene or polypropylene have widespread utility as packaging materials. The heat and solvent sealing properties of such polyolefin films (in the absence of special coatings) have not been entirely satisfactory for various reasons. For example, in attempting to heat seal polyolefin films, per se, the relatively high temperatures required to effect a satisfactory heat seal tend to cause distortion and wrinkling of the films, while satisfactory solvent sealing of polyolefin films, per se, is practically impossible with most common solvents.

Certain materials have been suggested heretofore to solve specific problems such as the heat-sealing problem or the solvent-sealing problem. For example, copolymers of ethylene/vinyl acetate have been suggested for solvent sealing. However, these materials tend to block to an undesirable degree in automatic packaging machinery. In another example, copolymers of ethylene/ethyl acrylate are satisfactory for heat sealing in automatic packaging machinery, but are not suitable for solvent sealing applications.

It has now been discovered that certain blends of the aforesaid copolymers are not only adaptable to both solvent and heat-sealing processes, but also overcome the tendency to block in automatic packaging machinery mentioned above. Thus, the present invention comprises a heat-sealable polyolefin film adapted particularly for use as a packaging and wrapping material for food products, tobacco products, confectionery products and the like, which film contains on at least one surface thereof, a coating consisting essentially of a blend of (a) a copolymer of ethylene/vinyl acetate, and
(b) a copolymer of ethylene/ethyl acrylate, the weight ratio of (a) to (b) in said blend being, respectively, from about 0.3 to 1 to about 1 to 0.7 (preferably from about 0.5:1 to about 1.1:1). The copolymer blend coatings of the present invention are relatively thin, generally having a thickness of at most about 3 mils and preferably having a thickness of from about 0.1 to about 1.5 mils.

Polyolefin films employed in this invention are those that are prepared from poly-α-olefins having from 2 to 10 carbon atoms such as polyethylene, polypropylene, poly-1-butene and the like. Polyethylene films that can be used in this invention are those prepared from so-called low density, medium density and high density polyethylene. Low density polyethylene has a density from about 0.91 to 0.929. Medium density polyethylene has a density of from 0.93 to 0.945. High density polyethylene has a density of from 0.946 to about 0.97. Films of high density polyethylene are preferred because of their high strength properties. The copolymers in the coating that is applied in accordance with the present invention consist mainly of ethylene, but contain at least about 5% by weight of combined secondary monomer (vinyl acetate or ethyl acrylate), and at most about 45 weight percent of the secondary monomer. Preferred copolymers are those containing from about 15 to about 30 weight percent of combined secondary monomer. Suitable copolymers generally have densities within the range of from about 0.9 to about 0.95 gram per cubic centimeter at 25° C. Useful copolymers also must have melt indices of at least about 5 and preferably within the range of from about 10 to about 55.

Methods for preparing the copolymers that are useful in practice of this invention are well known to those skilled in the art, and the particular method by which they are made is not critical insofar as the successful practice of this invention is concerned. Nor is the particular manner in which the copolymer blends of this invention are prepared critical. For example, any of the above-described useful copolymers (having a molecular weight of at least about 10,000) can simply be blended together in a "melt" state in the calculated proportions. Useful copolymer blends can also be prepared by simply dissolving the proper amounts of the individual copolymers in a suitable solvent. Application of the copolymer blends to the surface of a polyolefin film can be made by any of several well-known techniques such as, for example, by spraying, by dipping, and by brushing. Application of the coating can be made, if desired, by conventional roll coating techniques. Application to the film is preferably made by means of an aqueous emulsion of the copolymers, or from a solution of the copolymers in a suitable solvent. Suitable solvents for the copolymer blends of the present invention are either well known or can be readily ascertained via a simple solubility test. Such suitable solvents include (but are not limited to) toluene, xylene, cyclohexane, ethyl acetate, tetrachloroethylene, Stoddard Solvent and the like, as well as mixtures thereof.

The coated polyolefin films of this invention can be prepared by any of a number of ways. For example an aqueous emulsion of the blend of copolymers or a solution of the copolymers in a suitable solvent system can be applied to at least one surface of the polyolefin film having the desired final thickness. Then, the volatile components of the fluid coating can simply be removed from the coated surface by conventional drying techniques. Heat can be applied to hasten removal of the solvent and/or the water if desired. Also, the addition of heat can be utilized to increase adhesion of the resulting applied coating to the substrate. An applied powder of the copolymer blend can also be "fused" to the film base in this way. Note that a preferred procedure for preparing the coated films of this invention involves (a) initially the preparation of a simple mixture of aqueous emulsions of the individual copolymers,
(b) application of this mixture onto the polyolefin film surface,
(c) evaporation of the volatile components of the emulsion coating, and (d) finally fusion of the resulting copolymer blend at a temperature that is at most about 10° C. below the softening point of the polyolefin film.

Another method for preparing the coated films of the present invention involves application of the emulsion composition to at least one surface of a polyolefin film which has a thickness greater than that desired in the final product. Subsequently, the volatile components of the emulsion are removed. The coated sheet can then be compression rolled by passing it, for example, between a pair of heated rolls that are rotated at substantially the same speed, whereby the coated sheet is reduced in thickness to the desired extent and there is provided a unitary member comprising the polyolefin film having coated thereon a highly adherent blend of the copolymers described above. This rolling procedure can be accomplished either before or after the volatile components are removed from the initial coating.

The particular thickness of the coatings of this invention can be controlled fairly accurately by controlling the relative concentrations of the copolymer blends in the emulsions or in the solutions or in the "melts" that are applied to the polyolefin sheetings and the rates at which they are applied. The actual amounts of the coatings (after removal of any volatile components) that have been found to be useful are generally from about 0.2 to about 15 grams per square meter of film surface. Preferred levels fall within the range of from about 1 to about 5 grams per square meter. These amounts should be applied substantially uniformly over the surface of the polyolefin film (or at least that part of the film that will be subject to the heat or solvent sealing processes).

In the following examples all parts are by weight unless otherwise specified.

and can be readily solvent sealed to polyethylene or to M–4 cellophane, for example, at room temperature using methyl cellosolve. In addition, the resulting coated film is nonblocking when tested at 50° C. using a method similar to ASTM D884–48. Since test results by this ASTM rating system of "nonblocking" and "very slight blocking" yielded undamaged films, both of these categories have been lumped together under the term "PASS" in Table I, below.

EXAMPLE II

Tetrachloroethylene solutions (20 weight percent total solids), of several blends of copolymers, are coated onto conventional 1 mil compression rolled high density polyethylene films at a rate of 1 gram of solids per square meter of film. After being dried at a temperature of 100° C., the coated films are tested for their ability to avoid blocking as described above. The films are also solvent sealed at room temperature with various solvents and, after drying, are tested for seal strength. Results of these various tests are listed in Table I.

EXAMPLE III

Into 10 parts of xylene (290° F.) are dissolved 15 parts of a copolymer of ethylene/ethyl acrylate (containing 30% ethyl acrylate) having a melt index of 18, along with five parts of a copolymer of ethylene/vinyl acetate (containing 33% vinyl acetate) having a melt index of 15. One part of a conventional, non-ionic alkyl acryl polyether emulsifying agent and one part of a conventional wetting agent (sodium dioctyl sulfosuccinate) are added to the resulting dope. The dope is stirred vigorously while 280 parts of hot (190° F.) water is added thereto over a period of about 5 minutes. The resulting emulsion is then stirred continuously and allowed to cool slowly to

TABLE I

| Test No: | Parts copolymer A [1] | Parts copolymer B [2] | Blocking test | Solvent Seal Test | | | | |
|---|---|---|---|---|---|---|---|---|
| | | | | Stoddard solvent | Tetrachloroethylene | Cyclohexane | Ethyl acetate | Methyl cellosolve |
| a | 3 | 0 | FAIL | PASS | PASS | PASS | PASS | PASS. |
| b | 2 | 1 | FAIL | PASS | PASS | PASS | PASS | PASS. |
| c | 1.5 | 1.5 | PASS | PASS | PASS | PASS | PASS | PASS. |
| d | 1 | 2 | PASS | PASS | PASS | PASS | PASS | PASS. |
| e | 0 | 3 | PASS | FAIL | PASS | FAIL | PASS | FAIL. |

[1] Ethylene/vinyl acetate.
[2] Ethylene/ethyl acrylate.

EXAMPLE I

A mixture comprising 105 parts of ethylene/ethyl acrylate copolymer (30% ethyl acrylate) having a melt index of 18.5 and 35 parts of an ethylene/vinyl acetate copolymer (33% vinyl acetate) having a melt index of 25 is stirred into a blend of 490 parts of xylene and 210 parts of tetrachloroethylene. This mixture is then heated to about 200° F. Into the resulting solution are then dissolved 7 parts of a "cottonseed oil" monoglyceride (a commercial non-ionic emulsifier), and 7 parts of a commercial wetting agent (sodium dioctyl sulfosuccinate). The resulting hot solution is stirred vigorously while 1960 parts of hot water (200° F.) is slowly mixed into it thereby forming a fairly stable emulsion. The stability of the emulsion is then increased by passing it through a conventional, high-pressure homogenizer while it is still hot. Then, while it is stirred continuously, the temperature of the emulsion is slowly lowered to about 30° C.

This emulsion is then coated onto one side of 3.5 mil polyethylene film having a density of 0.96 gram per cubic centimeter at a rate of about 60 grams of emulsion per square meter of film. The resulting coated film is then passed through a conventional drying oven, followed by a three minute treatment at a temperature of about 110° C. (to fuse the coating). The resulting coated film can be readily heat sealed at a temperature of about 170° F.

room temperature. A 5 mil sheet of conventional polypropylene is coated on both sides with this emulsion using a conventional 0.036 inch wire wound rod. The coated sheet is then cured at 110° C. until substantially all of the volatile materials have been evaporated, and subsequently compression rolled to 1 mil (between 10 inch diameter conventional steel rolls heated to 200° F. under 3,000 pounds per linear inch pressure). The resulting film can be readily heat sealed at 220° F. in a conventional packaging machine or by means of a hand sealing iron held directly in contact with the film. This film also has excellent resistance to blocking and can readily be solvent sealed by conventional methods at room temperature with a variety of solvents including cyclohexane, tetrachloroethylene, Stoddard Solvent, methyl cellosolve and ethyl acetate.

It should be kept in mind that other materials can be present in minor amounts (preferably totalling below about 20 weight percent) in the copolymeric coatings of this invention without detracting substantially from the benefits that can be obtained by practicing the present invention.

We claim:

1. A heat and solvent sealable film comprising a polyolefin substrate and a coating on said substrate consisting essentially of a blend of (1) a copolymer of ethylene and vinyl acetate having a melt index of at least about 5 and a vinyl acetate content of about 5 to about 45 percent by weight and (2) a copolymer of ethylene and ethyl acrylate having a melt index of at least about 5 and an ethyl acrylate content of about 5 to about 45 percent by weight; the weight ratio of said copolymer of ethylene and vinyl acetate to said copolymer of ethylene and ethyl acrylate in said coating being in the range from about 0.3:1 to about 1:0.7 and the amount of said coating on said substrate being between about 0.2 and about 15 grams per square meter of coated surface.

2. A heat and solvent sealable film as described in claim 1 wherein said polyolefin is polyethylene.

3. A heat and solvent sealable film as described in claim 1 wherein said polyolefin is polypropylene.

4. A heat and solvent sealable film as described in claim 1 wherein said polyolefin is polyethylene, said copolymer of ethylene and vinyl acetate has a melt index of about 10 to about 55 and a vinyl acetate content of about 15 to about 30 percent by weight, said copolymer of ethylene and ethyl acrylate has a melt index of about 10 to about 55 and an ethyl acrylate content of about 15 to about 30 percent by weight, the weight ratio of said copolymer of ethylene and vinyl acetate to said copolymer of ethylene and ethyl acrylate in said coating is in the range from about 0.5:1 to about 1.1:1, and the amount of said coating on said substrate is between about 1 and about 5 grams per square meter of coated surface.

5. A heat and solvent sealable film as described in claim 1 wherein said polyolefin is polypropylene, said copolymer of ethylene and vinyl acetate has a melt index of about 10 to about 55 and a vinyl acetate content of about 15 to about 30 percent by weight, the weight ratio of said copolymer of ethylene and vinyl acetate to said copolymer of ethylene and ethyl acrylate in said coating is in the range from about 0.5:1 to about 1.1:1, and the amount of said coating on said substrate is between about 1 and about 5 grams per square meter of coated surface.

References Cited

UNITED STATES PATENTS

| | | |
|---|---|---|
| 3,027,346 | 3/1962 | Rugg et al. |
| 3,228,790 | 1/1966 | Sexsmith et al. |
| 3,285,766 | 11/1966 | Barkis et al. |
| 3,297,610 | 1/1967 | Moyer. |
| 3,399,165 | 8/1968 | Berger et al. |
| 3,405,083 | 10/1968 | Morrison et al. |

WILLIAM D. MARTIN, Primary Examiner

J. E. MILLER, Jr., Assistant Examiner

U.S. Cl. X.R.

117—138.8, 161; 260—897

PO-1050
(5/69)

UNITED STATES PATENT OFFICE
CERTIFICATE OF CORRECTION

Patent No. 3,483,023      Dated December 9, 1969

Inventor(s) Billy R. Dotson, Edward D. Morrison and Robert F. William

It is certified that error appears in the above-identified patent and that said Letters Patent are hereby corrected as shown below:

Column 6, line 5, immediately following "by weight," insert --said copolymer of ethylene and ethyl acrylate has a melt index of about 10 to about 55 and an ethyl acrylate content of about 15 to about 30 percent by weight,--

SIGNED AND
SEALED
MAY 12 1970 d M. Fletcher, Jr.
ing Officer

WILLIAM E. SCHUYLER, JR.
Commissioner of Patents